United States Patent

Kabayama et al.

Patent Number: 4,911,278
Date of Patent: Mar. 27, 1990

[54] DAMPER DISK HAVING AXIALLY OPPOSED DIAPHRAM SPRINES

[75] Inventors: Yoshiaki Kabayama; Hiromi Tojima, both of Hirakata; Hiroshi Takeuchi, Higashiosaka; Kimio Mizuguchi, Neyagawa, all of Japan

[73] Assignee: Kabushiki Kaisha Daikin Seisakusho, Osaka, Japan

[21] Appl. No.: 246,821

[22] PCT Filed: Jan. 16, 1988

[86] PCT No.: PCT/JP88/00032

§ 371 Date: Aug. 5, 1988

§ 102(e) Date: Aug. 5, 1988

[87] PCT Pub. No.: WO88/05505

PCT Pub. Date: Jul. 28, 1988

[30] Foreign Application Priority Data

Jan. 19, 1987 [JP] Japan .................... 62-10803
Jan. 28, 1987 [JP] Japan .................... 62-17964

[51] Int. Cl.$^4$ .......................... F16D 3/14; F16D 47/02
[52] U.S. Cl. ............................ 192/106.1; 192/30 L; 192/70.17
[58] Field of Search ................ 192/30 V, 70.17, 106.1

[56] References Cited

FOREIGN PATENT DOCUMENTS

| 1285339 | 12/1968 | Fed. Rep. of Germany ... | 192/106.1 |
| 1320363 | 1/1963 | France ............................. | 192/106.1 |
| 6128100 | 8/1982 | Japan . | |
| 755531 | 8/1956 | United Kingdom ............. | 192/106.1 |

Primary Examiner—Rodney H. Bonck
Assistant Examiner—Nicholas Whitelaw
Attorney, Agent, or Firm—Armstrong, Nikaido, Marmelstein, Kubovcik & Murray

[57] ABSTRACT

A damper disk comprises a hub connected to an output shaft, an input part disposed around the hub, a pair of diaphragm springs disposed at axially opposite sides of the input part, a fulcrum mechanism through which the diaphragm springs are supported by the input part, and a cam mechanism disposed between the radially inner portions of the diaphragm springs. The cam mechanism includes an output cam rigidly connected to the hub, and a pair of input cams axially engaging the diaphragm springs and unrotatably connected to the input cams, respectively. Both of the input cams are adapted to move axially oppositely in accordance with relative rotation between the input and output cams.

9 Claims, 3 Drawing Sheets

U.S. Patent    Mar. 27, 1990    Sheet 1 of 3    4,911,278
FIG.1
FIG.2
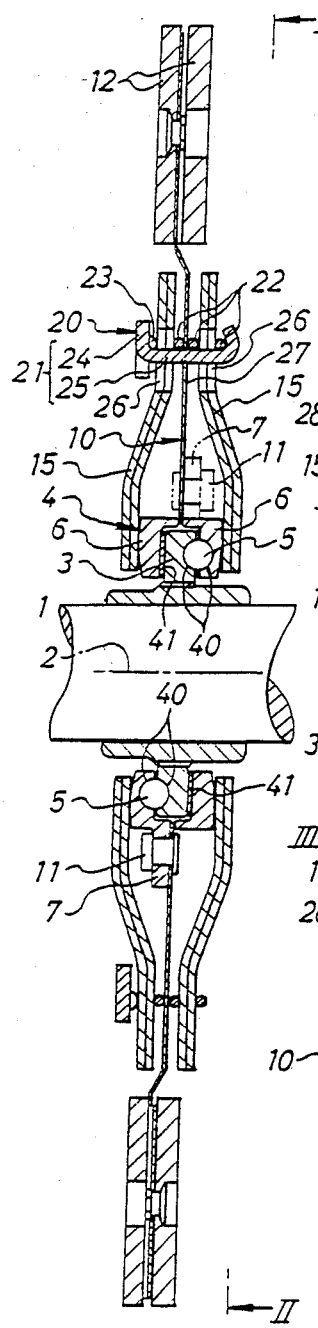
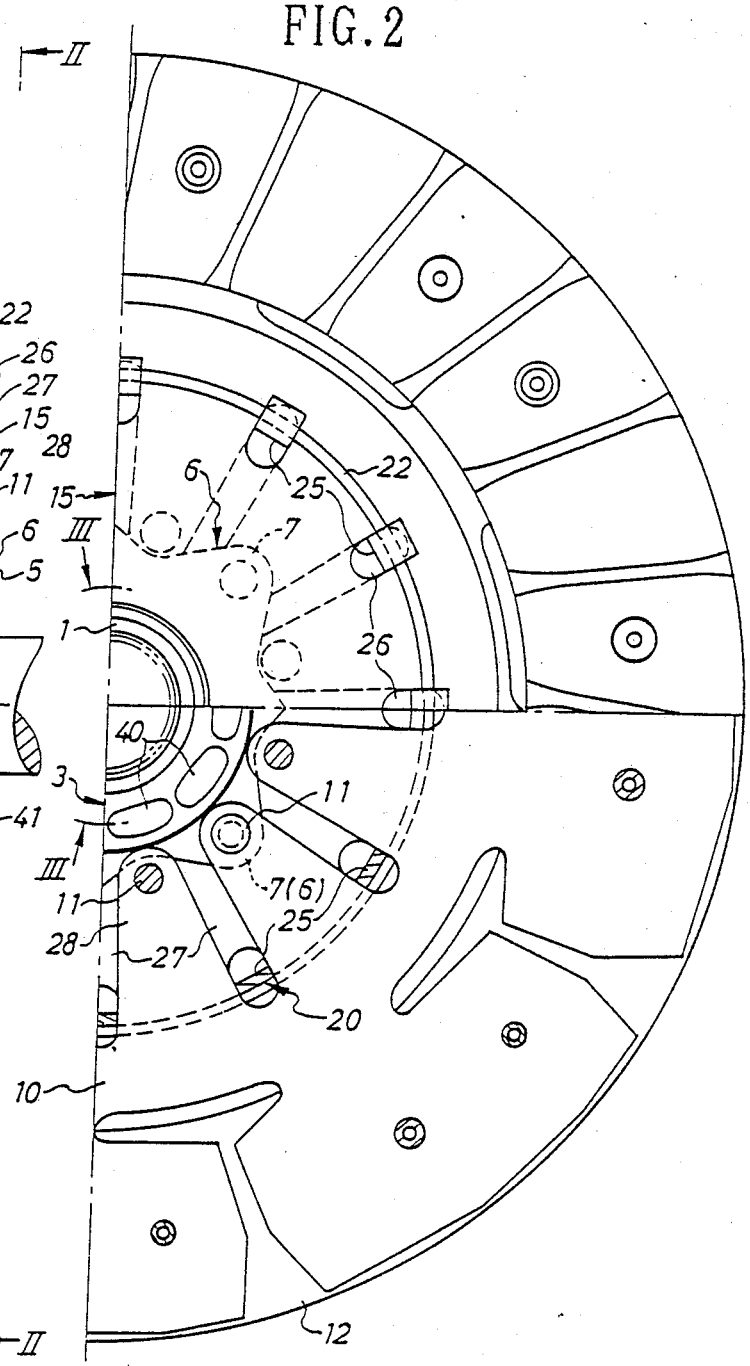

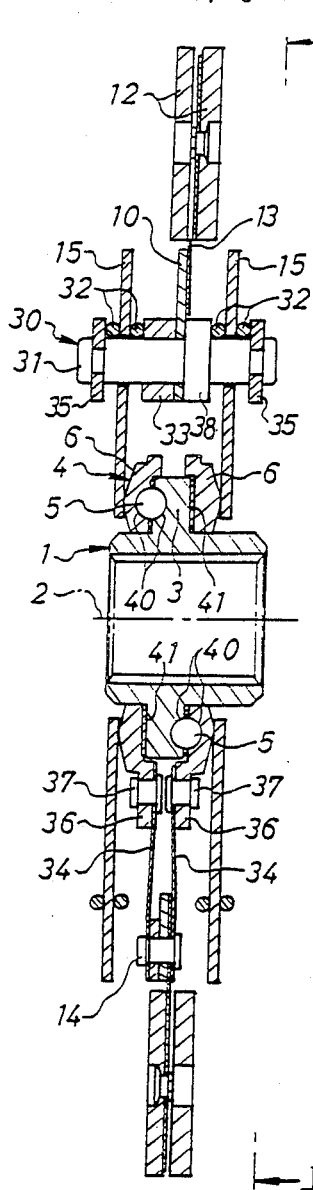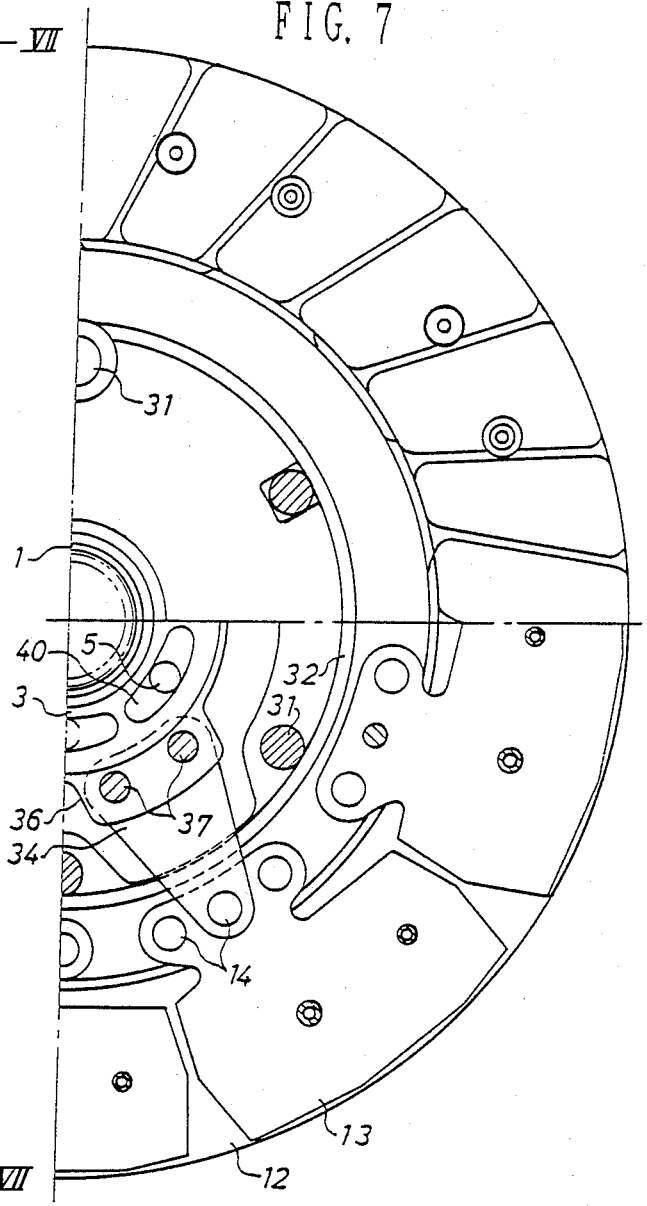

DAMPER DISK HAVING AXIALLY OPPOSED DIAPHRAM SPRINES

BACKGROUND OF THE INVENTION

1. Field of the Invention

The present invention relates to a damper disk used as clutch disks for automobiles and others, and particularly to a damper disk including a spring adapted to elastically and axially deflect for absorbing or damping vibration of rotational torque.

2. Description of the Prior Art

The damper disk of the type described above can generally have a large relative torsion angle between an input and output parts or members, and thus can effectively absorb the torque vibration as compared with conventional structures in which springs for absorbing the torque vibration are compressed in a circumferential direction of the disk.

Examples of the disks including such axially deflectable spring are disclosed in the Japanese Utility Model application No. 58-89711 (Laid-Open Publication No. 59-194638) and Japanese Patent Application No. 61-152290, which are commonly assigned to Kabushiki Kaisha Daikin Seisakusho, assignee of the present application.

The disk according to the former application comprises a helical spline as means for converting a relative rotational movement between an input and output parts into an axial movement. This helical spline requires complieated machining work.

The disk according to the latter application can dissolve such a disadvantages. It comprises a cam mechanism as movement converting means. In this cam mechanism, when the cam at an input side rotates relative to a cam at an output side, the cam at the input side axially moves to deflect a diaphragm spring in the same direction.

In the disk including the cam mechanism, a clutch plate which is connected to a friction facing is utilized as a support member for axially supporting the cam mechanism from the side opposite to the diaphragm spring. Therefore, if such structures are employed in such a type of disk that have especially large maximum torsion angle and/or torsion torque, the clutch plate may be plastically deformed by the reaction force caused by elastic deflection of the diaphragm spring, in which case the elastic force of the diaphragm spring is reduced and the disk can not effectively achieve the intended damping function.

SUMMARY OF THE INVENTION

According to the invention, a damper disk comprises a hub connected to an output shaft, an input part disposed around the hub, a pair of diaphragm springs disposed at axially opposite sides of the input part, a fulcrum mechanism through which the diaphragm springs are supported by the input part, and a cam mechanism disposed between the radially inner portions of the diaphragm springs. The cam mechanism includes an output cam rigidly connected to the hub, and a pair of input cams axially engaging the diaphragm springs and unrotatably connected to the input cams, respectively. Both of the input cams are adapted to move axially oppositely in accordance with relative rotation between the input and output cams.

In the illustrated embodiment, the fulcrum mechanism comprises wire rings which are seated on the diaphragm springs to form fulcrums thereof, and bent plate members for immovably supporting all of the wire rings.

The input part may be formed by one driven plate including a portion to which a friction facing is fixed and a portion which supports the wire rings. The driven plate may integrally include portions to which the input cams are connected.

Further, in the embodiment, the fulcrum mechanism includes wire rings which are seated on the diaphragm springs to form fulcrums thereof, respectively, and circumferentially spaced and axially extending rod-like support members, each of which is fixed at its axially middle portion to the input part, radially immovably supports the wire rings and supports at its opposite ends the diaphragm springs through the wire rings.

The cam mechanism may include rolling members disposed between the input cams and output cam, and springs axially elastically pressed to the input cams and output cam may be disposed therebetween except for the regions in which the rolling members are disposed.

According to the above-mentioned structures, the rotational force is transmitted from the input part through the input cams and output cam to the output hub. In this operation, the input cams twist or rotate relative to the output cam through a torsion angle and elastically deflect the diaphragm spring through a distance corresponding to the torsion angle. This axially deflection effects to prevent a sudden fluctuations of the torque and to absorb the torque vibration.

In the above operation, a pair of the input cams deflect the diaphragm springs arranged at opposite sides of the cam mechanism in the directions opposite to each other. Therefore, the reaction forces of the deflected diaphragm springs are canceled by each other and are not applied to the input part as a bending force.

BRIEF DESCRIPTION OF THE DRAWINGS

Embodiments of the invention will now be described by way of example only, with reference to the accompanying drawings, in which;

FIG. 1 is a sectional view of a damper disk of an embodiment according to the invention;

FIG. 2 is a fragmentary plan view taken along line II—II in FIG. 1 with a certain part cut away;

FIG. 6 is a sectional view of still another embodiment; and

FIG. 7 is a fragmentary plane view taken along line VII—VII in FIG. 6 with a certain part cut away.

DETAILED DESCRIPTION OF THE PREFERRED EMBODIMENTS

Figure 3:
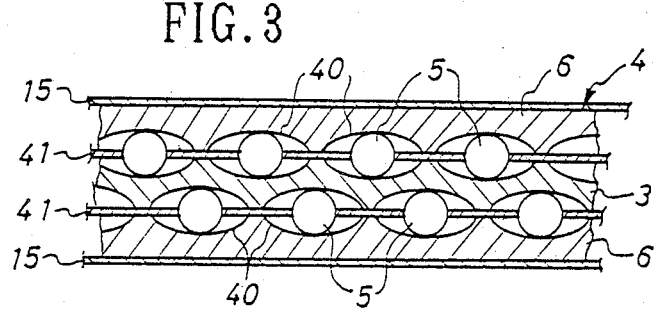
FIG. 3 is an fragmentary enlarged sectional view taken along line III—III in FIG. 2.

Referring to FIG. 1, an output hub 1 is splined to an output shaft 2, only a center line of which is illustrated. The hub 1 has an outer periphery to which an annular flange 3 is fixedly fitted. The flange 3 forms an output cam or a cam portion at the output side of a cam mechanism 4. At the axially opposite sides of the flange 3 are disposed a pair of cam races 6 with a plurality of balls 5 therebetween, respectively. The cam races 6 form input cams or cam portions at the input side of the cam mechanism 4, and are provided at the outer peripheries with a plurality of projections 7, respectively. An annular driven plate 10 is disposed around the cam mechanism 4. The projections 7 are fixed to the inner peripheral portion of the driven plate 10 by axial rivets 11. A pair of friction facings 12 are riveted to the opposite surfaces of the radially outer portion of the driven plate 10.

A pair of axially spaced diaphragm springs 15 or spring assemblies are disposed radially inside the facings 12 with the driven plate 10 therebetween. Each diaphragm spring 15 consists of two superimposed spring plates. The diaphragm springs 15 are supported at their radially outer portions by the driven plate 10 through a support mechanism 20, and engage at their inner peripheral portions with the cam races 6 of the cam mechanism 4 from the side opposite to the balls 5, respectively. The diaphragm springs 15 have the radially middle portions which are inclined so that an axial distance between the radially outer portions may be narrower than that between the radially inner portions.

The support mechanism 20 includes a support plate 21 and three wire rings 22. The support plate 21 includes an annular portion 24 extending along the diaphragm spring 15, a plurality of tabs 25 or extensions and circumferentially spaced fulcrum portions 23. The annular portion 24 is located adjacent to the outer periphery of one of the diaphragm springs 15. The tabs 25 are circumferentially spaced from each other and entend from the inner periphery of the annular portion 24. Each tab 25 is bent with respect to the annular portion 24 and axially extends through an opening 26 in the diaphragm spring 15 and a slit 27 in the driven plate 10. The fulcrum portions 23 consist of projections formed at the surface of the annular portion 24.

The wire rings 22 and the fulcrum portions 23 form fulcrums for the diaphragm springs 15. The wire rings 22 are disposed between each diaphragm spring 15 and the driven plate 10 as well as on the surface of one of the diaphragms 15 opposite to the driven plate 10, and are in direct contact with them, respectively. The fulcrum portions 23 are directly seated on the surface of the other diaphragm spring 15 opposite to the driven plate 10. These wire rings 22 are supported at their inner peripheries by the tabs 25. The tabs 25 have free ends which are curved radially outwardly, and the wire ring 22 adjacent thereto are pinched between the diaphragm spring 15 and the curved ends.

Referring to FIG. 2, the driven plate 10 has a circumferentially continuous portion radially outside the slits 27 and tongues 28 divided by the slits 27 which are fixed at their radially inner ends to the projections 7 of the cam races 6, as described before. The projections 7 of one of the cam races 6 are circumferentially shifted to the projections 7 of the other of the cam races 6, so that the projections 7 and rivets 11 of both cam races 6 are not axially overlapped, and thus a sufficiently large space is maintained for the provision of the rivets 11 and riveting work.

The cam mechanism 4 will be described more in detail hereinafter. Referring to FIG. 3, a plurality of circumferentially spaced cam grooves 40 are formed at opposite surfaces of the flange 3 and the surfaces of respective cam races 6 facing thereto. The balls 5 are fitted into the axially opposed cam groove pairs, respectively. Each cam groove 40 extends in the circumferential direction of the disk and has a slowly inclined bottom surface on which the ball 5 rolls. Thus, when the cam races 6 rotate relative to the flange 3, the cam races 6 move axially oppositely to each other to axially deflect the diaphragm spring 15.

A wave spring 41 is interposed between each cam race 6 and the flange 3. The wave springs 41 are annular plate springs which are wavedly curved in the free condition prior to the assembly, and have apertures for the balls 5 so that they may also act as retainers for the balls 5, respectively. The wave springs slidably contact with the flange 3 and the cam races 6 except for the regions of the cam grooves 40 at least when the relative torsion angle between the flange 3 and the cam races 6 is small, i.e., at least when only a short axial space is formed between the flange 3 and the cam races 6.

According to the structures described above, when the facing 12 is pressed onto a flywheel (not shown) of an engine by a pressure plate (not shown), a rotational torque is transmitted from the flywheel through the facings 12 to the driven plate 10. The rotational torque is transmitted from the driven plate 10 through the cam races 6 and balls 5 to the flange 3, and then is transmitted through the hub 1 to the output shaft 1.

When the rotational torque is transmitted as described above, the cam races 6 twist relative to the flange 3, and axially move in accordance with the twist motion to elastically deflect the diaphragm springs 15. This elastical deflection effects to damp the harmful torque fluctuation and absorb the torque vibration.

Figure 4:
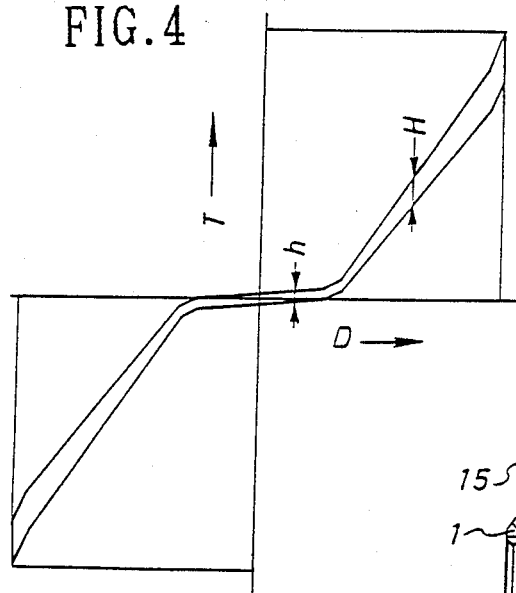
FIG. 4 is a graph showing torsion characteristics.

The shapes of the cam grooves 40 are so determined that the deflected quantity of the diaphragm springs 15 and thus the torsion torque (rotational torque) may increases as the torsion angle increases. In the illustrated embodiment, the sizes and shapes of the grooves 40 are so determined that the torsion characteristics may be obtained as shown in FIG. 4, in which D indicates the torsion angle and T indicates a torsion torque.

In the operation described above, a pair of the cam races 6 deflect a pair of the diaphragm springs 15 in the axially opposite directions. Therefore, the reaction forces caused by the deflections of the diaphragm springs 15 are canceled by each other, and do not act to bend the driven plate 10.

When the relative torsion angle between the hub 1 and the driven plate 10 (i.e., between the flange 3 and the cam races 6) is small, the axial spaces between the flange 3 and the cam races 6 are short, so that the wave spring 41 are maintained in largely compressed condition, and thus they are strongly pressed onto the flange 3 and the cam races 6. Therefore, a relatively large friction force is generated on the surfaces of the wave springs 41 during the torsion operation, which causes hysteresis torque h in the damping or torsion characteristcs in FIG. 4.

As the torsion angle increases, the friction force of the wave springs 41 decreases. However, since the pressing force between the balls 5 and the bottom surfaces of the cam grooves 40 increases, a large hysteresis torque H is obtained as shown in FIG. 4 by the rolling friction at the cam grooves 40. As described above, since the hysteresis torque is generated throughout the torsion operation, and particularly the hysteresis torque is generated even at the region of the small torsion angle, the vibration can be effectively absorbed also by virtue of the hysteresis torque.

According to the invention, as described hereinbefore, a pair of the diaphragm spring 15 are used in such a way that the reaction force by their elastical deflection is not applied to the input part (driven plate 10) as the bending force. Therefore, it is possible to prevent the deformation of the input part, and thus, the intended damping characteristics can always be maintained and the intended torque vibration abosrbing effect can be obtained. Further, it is not necessary to form the driven plate 10 by a particularly stiff plate, the weight of the driven plate 10 can be reduced.

In the embodiment illustrated in FIG. 1, the wire rings 22 are used as the fulcrums of the diaphragm springs 15, and fixedly seated on the driven plate 10 by the bent plate, i.e., the support plate 21. Therefore, the number of the assembly steps of the fulcrum mechanism 20 can be reduced, resulting in the simple assembly process. Further, the weight can be light, resulting in the reduced rotational inertia.

Further, the weight of the input part can be reduced also by the fact that the diaphragm springs 15 are seated on the input part (i.e., driven plate 10) through the wire rings 22, as described below. The drive plate 10 can be formed by a single plate which includes portions for supporting the diaphragm spring 15, the portion for supporting the facings 12 (i.e., the portion in which elasticity is required for absorbing axial vibration) and the portion (tongues 28) connected to the cam races 6. Therefore, the number of the parts can be reduced, resulting in the simple assembling operation, and the weight and the inertia can be reduced as compared with the structures in which the above-mentioned several portions are formed by independent parts or plates.

Since the wave springs 41 are associated in the cam mechanism 4 for generating the intended hysteresis torque h even at the low torsion angle region, the vibration absorbing effect can be sufficiently achieved throughout the torsion operation.

Figure 5:
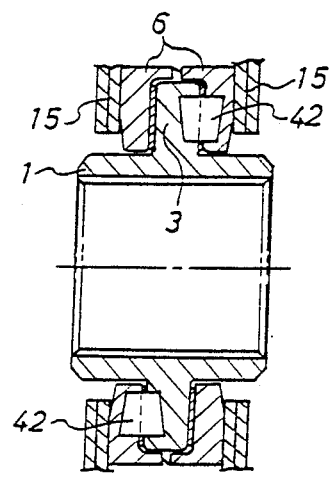
FIG. 5 is a fragmentary sectional view of another embodiment.

The balls 5 in FIG. 1 may be replaced by rollers 42, as shown in FIG. 5 as the rolling members in the cam mechanism 4.

The invention may be embodied as shown in FIGS. 6 and 7, in which those parts and members corresponding to those in FIGS. 1 and 2 bear same reference numbers, and detailed description thereof are omitted.

According to the embodiment in FIGS. 6 and 7, the flange 3 is integrally formed around the hub 1. A plurality of circumferentially spaced cushioning plates 13 are fixed at their inner peripheral portions to the driven plate 10 by rivets 14. A pair of the friction facings 12 are riveted to the opposite surfaces of the cushioning plates 13. Each diaphragm spring 15 is formed by one plate spring, which is substantially flat in the illustrated neutral position. Each diaphragm spring 15 is supported at the radially outer portion by the driven plate 10 through a support mechanism 30.

The support mechanism 30 includes support pins 31 or rod-like support members, which are formed by rivets in the illustrated embodiment, and wire rings 32. The support pins 31 are six in number and are circumferentially equally spaced from each other. Each pin 31 axially extends through apertures formed in the driven plate 10 and the diaphragm springs 15. Each support pin 31 has a portion adjacent to one side of the driven plate 10, to which a collar 33 is fitted, and a portion 38 adjacent to the other side, which has a large diameter. The wire rings 32 are interposed between the collars 33 and the diaphragm spring 15, between the large-diameter portions 38 and the spring 15 and between the spring 15 and washers 39 supported by the ends of the pins 31. All of the wire rings 32 are supported at their inner periphery by the support pins 31.

The driven plate 10 has an inner diameter larger than that of the plate 10 in FIG. 1, and is connected to the cam mechanism 4 by means of substantially radial straps 34. The straps 34 are circumferentially spaced from each other and are fixed to the driven plate 10 by the rivets 14. The straps 34 are disposed at opposite sides of the driven plate 10, and extend from the driven plate 10 to the vicinity of the cam mechanism 4, respectively. Each cam race 6 has radially outward projections 36, to which the radially inner ends of strap 34 are fixed respectively by two rivets 37.

FIG. 7 also illustrates the structures of the support pin 31, straps 34, rivets 37 and others described above.

The cam mechanism 4 in FIGS. 6 and 7 has substantially same structures as those in FIG. 3.

According to these structures, operation and effect can be similar to or same as those by the structures in FIGS. 1–3.

When the present invention is employed in the damper disk used as the clutch disk for the automobile, the relative torsion angle between the input and output parts in the disk can be large for improving the absorbing effect for the torque vibration, and the disk can be constructed without the problems relating to the strength.

What is claimed is:

1. A damper disk comprising a hub connected to an output shaft;
   an input part disposed around said hub;
   a pair of diaphragm springs radially disposed at axially opposite sides of said input part;
   a fulcrum mechanism supporting said diaphragm spring on said input part; and
   a cam mechanism disposed between a radially inner portion of said diaphragm spring and said input part;
   said cam mechanism including an output cam rigidly connected to the outer periphery of said hub, a pair of input cams between said output cam and said diaphragm springs and a plurality of roller elements between said output cam and said input cams for unrotatably connecting said cams;
   said input cams being movable axially and oppositely relative to each other in accordance with relative rotation between said input and output cams.

2. A damper disk of claim 1 wherein said fulcrum mechanism comprises wire rings seated on said diaphragm springs and forming fulcrums thereof, and bent plate members for immovably supporting said wire rings.

3. A damper disk of claim 1 wherein said input part is formed by one driven plate including a first portion to which a friction facing is fixed and a second portion which supports said wire rings.

4. A damper disk of claim 3 wherein said driven plate integrally includes driven plate portions to which said input cams are connected.

5. A damper disk of claim 1 wherein said fulcrum mechanism includes wire rings which are seated on the diaphragm springs and form fulcrums therefor and circumferentially spaced and axially extending rod-like support members, each of said rod like support members being fixed at its axially middle portion to said input part, radially immovably supports the wire rings and, through said wire rings, supports at its opposite ends said diaphragm springs.

6. A damper disk of claim 1 wherein said cam mechanism includes rolling members disposed between said input cams and said output cam, and springs axially elastically pressed to said output cam and said output cam and disposed therebetween except for the regions in which said rolling members are disposed.

7. A damper disk of claim 1 wherein said diaphragm springs are supported at radially outer portions of said diaphragm springs to said input part by said fulcrum mechanism.

8. A damper disk of claim 1 wherein said diaphragm springs are seated at the radially inner portion of said diaphragm springs on said input cams.

9. A damper disk of claim 1 wherein said diaphragm springs are supported at radially outer portions of said diaphragm springs to said input part by said fulcrum mechanism and are seated at the radially inner portions of said diaphragm springs on said input cams.

* * * * *